United States Patent [19]

Tantlinger

[11] 4,031,677

[45] June 28, 1977

[54] FLOOR SLAB TO SIDE WALL JOINT STRUCTURE FOR TRANSIT VEHICLE

[75] Inventor: Keith W. Tantlinger, Coronado, Calif.

[73] Assignee: Rhor Industries, Inc., Chula Vista, Calif.

[22] Filed: Apr. 21, 1976

[21] Appl. No.: 678,732

[52] U.S. Cl. .................................. 52/262; 52/265; 52/285; 52/288; 52/588; 403/266; 403/267; 403/315; 403/353
[51] Int. Cl.² .................... E04C 1/10; F16B 1/00
[58] Field of Search ............ 52/285, 265, 288, 262, 52/588, 429, 570, 571; 403/353, 266, 267, 315

[56] References Cited

UNITED STATES PATENTS

| | | | |
|---|---|---|---|
| 1,309,064 | 7/1919 | Flahwe | 52/429 |
| 1,770,082 | 7/1930 | McPherson | 52/570 |
| 2,786,556 | 3/1957 | Constance, Jr. | 52/588 |
| 3,156,210 | 11/1964 | Lyon | 52/758 D |
| 3,590,545 | 7/1971 | Webb | 52/394 X |
| 3,708,938 | 1/1973 | Tantlinger | 52/588 |
| 3,780,481 | 12/1973 | TOmkins | 52/588 |
| 3,813,839 | 6/1974 | Simpson, Jr. et al. | 52/588 |
| 3,815,306 | 6/1974 | Tantlinger | 52/285 |
| 3,823,525 | 7/1974 | Bruun | 52/309 X |

Primary Examiner—Alfred C. Perham

[57] ABSTRACT

Each prefabricated side wall of a transportation type vehicle has a joint surface formed along the lower, inner side thereof for seating thereto the laterally outward edge portions of two flanges which extend laterally outwardly in vertically spaced, parallel relation along each side of a prefabricated floor slab of such vehicle. An upwardly tapered bead along the outer edge of the uppermost of each pair of such flanges enters a recess provided therefor along its respective side wall surface. Also, one half of a plastic-key-interlock joint is formed along the outer edge of the lowermost flange of each pair for interlocking engagement with a second half of each such joint which is formed along each such joint surface. With the side walls substantially perpendicular to the floor slab, upward movement of each tapered bead into its recess also moves the joint halves associated therewith into interlocking engagement with each other, and simultaneously opens up a key-forming passage lengthwise within each joint. These passages are filled with a flowable, hardenable compound, which secures the joints in interlocked relation, and retains the beads in their respective recesses.

4 Claims, 2 Drawing Figures

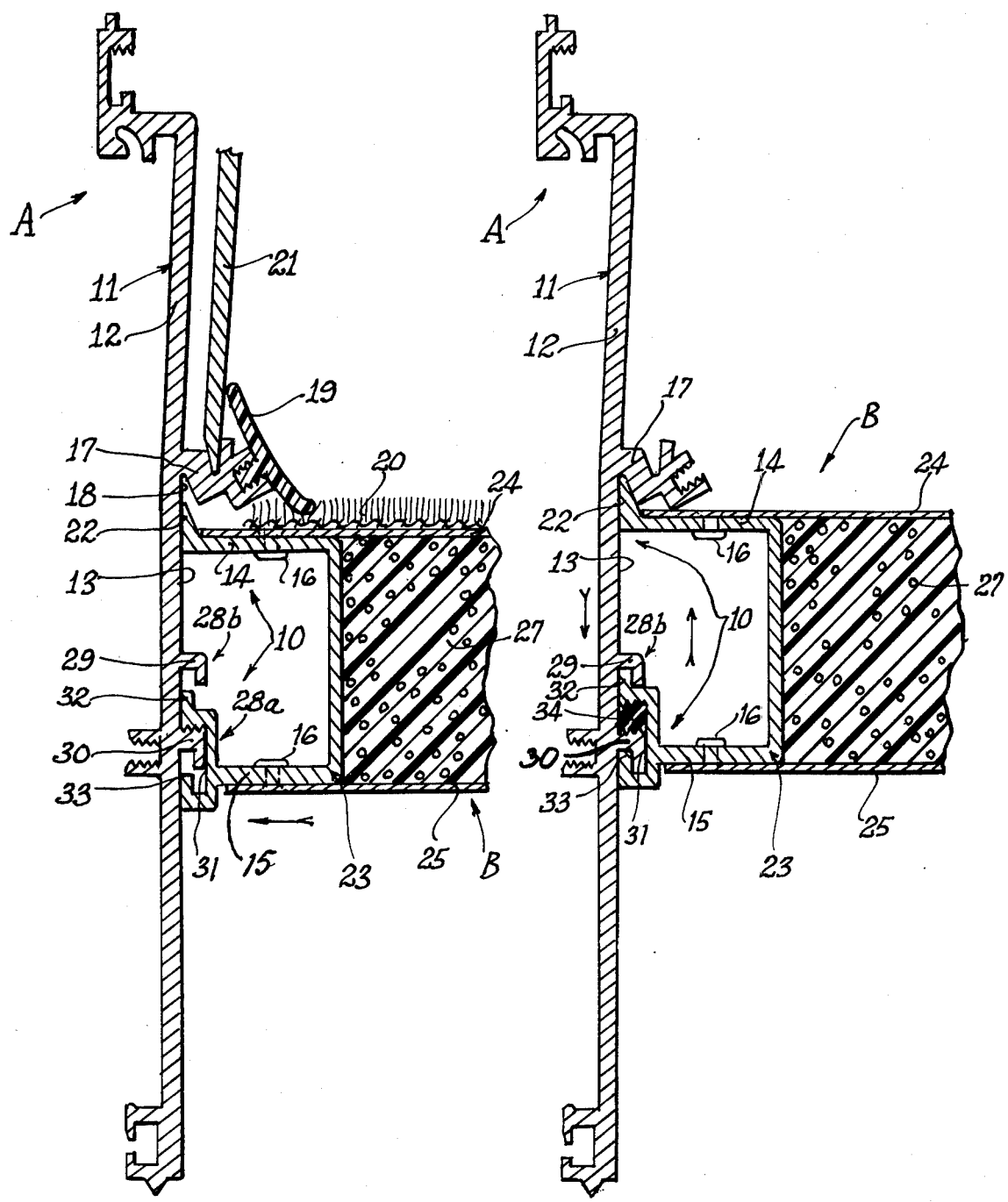

4,031,677

FLOOR SLAB TO SIDE WALL JOINT STRUCTURE FOR TRANSIT VEHICLE

BACKGROUND OF THE INVENTION

In the manufacture of transit vehicles, such as buses and rail cars, a presently preferred practice employs side wall structures, at least the lower portions of which are covered with extruded aluminum strakes. The strakes are secured to a supporting frame, and a floor structure is provided comprising a sandwich panel slab with a structural plastic foam core and top and bottom facing sheets of suitable material, for example, aluminum or stainless steel. In my U.S. Pat. No. 3,815,306, assigned to the Assignee of the present invention, a floor slab of such general nature is disclosed, with an outwardly open channel secured between laterally outwardly extending edge portions of the upper and lower facing sheets along each side of the slab. A tapered bead is formed along the upper flange of each side channel, and is seated in a recess provided therefor along a lower, inwardly facing surface of each side wall, while the lower flange of each side channel is provided with a downwardly extending riveting flange, which seats against, and is riveted to, its respective side wall.

Such floor mounting arrangement, while providing great strength and rigidity, and being relatively simple to assemble, still requires the drilling or punching of a large number of rivet holes, and the seating of the rivets therein to complete the assembly. The present invention is a substantial improvement over such joint structure, and provides strong, rigid, interconnection between the floor and side wall structure of a transit vehicle, which interconnection is of uniform strength throughout its length, perfectly sealed, and entails substantially reduced material costs and labor input. In accomplishing this improvement the invention employs a plastic key interlock joint structure of the same general nature as that disclosed in my co-pending application, Ser. No. 594,828, filed July 10, 1975 now U.S. Pat. No. 3,992,846, and assigned to the assignee of the present invention.

SUMMARY OF THE INVENTION

The invention provides an improved side wall-to-floor slab joint structure for a transit vehicle having two parallel, vertically spaced flanges extending laterally along each side of the floor slab. One of the flanges of each pair thereof has a bead along its outer edge, which fits into a recess which extends along a joint surface provides along the lower, inner side of its respective side wall. The other flange of each pair thereof has one half of a plastic key interlock joint comprising its outer edge portion, and each of said flange-mounted joint halves fits in interlocked relation into a second joint half formed integrally, one along each side wall. With the side walls mounted substantially perpendicularly along the two sides of the floor slab, relative vertical movement of the floor slab to each side wall seats each bead in its respective recess, and moves the joint halves into interlocked relation with each other. This same movement opens up a key-forming passage lengthwise within each joint, and the injection of a flowable, hard-enable compound into these passages secures the parts in such interlocked condition.

BRIEF DESCRIPTION OF THE DRAWINGS

Objectives and advantages of the invention will be apparent from the following description and the accompanying drawings wherein:

FIG. 1 is a fragmentary, vertical, transverse, sectional view of the side wall-to-floor joint zone of a transit vehicle embodying the present invention, and shows the floor slab flanges in their position of initial engagement with the joint surfaces of their respective side walls.

FIG. 2 is a view similar to FIG. 1, but shows the side wall moved relatively downward to insert the bead in its recess, and to move the joint halves into interlocked relation with each other. This view also shows the plastic key material injected into the key-forming joint passage.

DETAILED DESCRIPTION OF THE DRAWINGS

Referring to the drawings in detail, a lower structural element A of each side wall of a transit vehicle, such as a bus or rail car, is connected to the floor slab B thereof by joint structure 10 embodying the present invention. Since the joint structures for both sides of the vehicle are similar, that for one side only is illustrated and described herein. For making the joint structure 10, the element A, which as illustrated is an extruded aluminum strake, preferably extends substantially the entire length of the vehicle, and is a lower, structural element of each vehicle side wall. The strake 11 comprises an upright plate portion 12, having an inner, floor joint surface 13 thereof shaped and positioned to have seating engagement with the outer edge portions of two floor slab side flanges 14 and 15 to be described in detail later herein.

An irregularly shaped flange 17, which is extruded integrally with the plate portion 12, extends along the upper edge of the joint surface 13. The flange 17 has a downwardly and inwardly inclined base portion which defines a wedge shaped recess 18 between it and the joint surface 13. This base portion of the flange 17 and recess 18 formed thereby are the only features of the flange 17 which are material to the present invention, since the remainder of the flange, as shown in FIG. 1, provides for the mounting of a snap-on strip 19, which masks and attaches the edge of the floor covering 20, and also masks the lower edge of wall paneling 21.

The recess 18 is shaped to receive, in fitted, relation, an upwardly extending, tapered bead 22, formed integrally along the laterally outward edge of the upper flange 14 of an outwardly open, extruded channel member 23, one of which channels is incorporated with, and extends along, each side of the floor slab B. Each of the channels 23 is secured, as by bonding, or rivets 16, between outwardly extending portions of upper and lower facing sheets 24 and 25 of the floor slab B, which facing sheets are of suitable material such as aluminum or stainless steel. The floor slab B is a sandwich panel, comprising a core 27 of structural, plastic foam interposed between, and preferably bonded to, the upper and lower facing sheets 24 and 25.

Along the laterally outward edge of each lower channel flange 15 is formed integrally one half 28a of a plastic key interlock joint 28 of the general type, but different from, that disclosed in my U.S. Pat. No. 3,992,846, referred to previously herein. Each flange-mounted joint half 28a is constructed and arranged to have interlocking connection with the other half 28b of each said joint, which other half comprises two angle flanges 29 and 30 formed integrally along the floor joint surface 13 of each side wall extrusion 11.

The floor-mounted joint half 28a comprises an outwardly open channel 31, comprising the outer edge portion of the lower floor flange 15, and with locking flanges 32 and 33 extending upwardly from the channel sides 29 and 30, respectively.

The two wall mounted angle flanges 29 and 30 of each joint are shaped and located to define recesses therebeneath to receive, respectively, in fitted relation, the flanges 32 and 33 of their respective floor mounted joint half 28a, and with the parts in their initial position of engagement shown in FIG. 1, the angle flange is located within the channel 31.

OPERATION OF THE ILLUSTRATIVE EMBODIMENT OF THE INVENTION

With the parts of the floor-to-side wall joint of the invention in their position of initial engagement with each other as shown in FIG. 1, upon a relative upward movement of the floor slab B from its position of FIG. 1 to its position of FIG. 2, the bead 22 is wedged into its recess 18, while at the same time the upwardly directed flanges 32 and 33 of each joint half 28a are moved into seated relation in their respective recesses provided by the angle flanges 29 and 30 of each second joint half 28b.

Such relative movement of the floor slab and side walls preferably is accomplished by supporting the floor slab B by suitable means, for example, as disclosed in copending U.S. patent application, Ser. No. 660,554, filed Feb. 23, 1976 now U.S. Pat. No. 4,004,392 , by George Heffner, assigned to the Assignee of the present invention, and allowing the side wall A to lower relatively thereto by gravity. This same relative movement of the floor slab and side walls also opens up a key forming passage 34, see FIG. 2, within each joint 28.

The passage 34 is then filled with a suitable flowable, hardenable compound, for example, activated epoxy resin, injected under selected pressure therein. This compound, upon hardening, comprises a key which secures the joint 28 in interlocked condition, and retains the bead 22 in its recess 18, thereby providing a floor slab-to-side wall joint structure 10 that is tremendously strong, rigid, hermetically sealed, and of uniform structure and equal strength throughout its entire length. The entire floor slab-to-side wall connection is readily accomplished in just a few minutes, by means of the present invention, and with minimum labor input.

Having thus described my invention, what I claim as new and useful, and desired to be secured by United States Letters Patents is:

1. In a transit vehicle having a floor slab, two side walls, and a roof, floor-to-side wall joint joining each side wall substantially perpendicularly to a side of the floor slab, each joint structure comprising:
    an extrusion comprising a lower structural element of each vehicle side wall and having a laterally inwardly exposed joint surface formed therealong,
    a pair of vertically spaced, laterally outwardly extending flanges substantially integral with, and extending along each side of the floor slab, the laterally outward edge portions of each pair of said flanges being contact with their respective said side wall joint surface,
    means integral with each of said side wall extrusions forming a vertically open, bead-receiving recess extending along each such joint surface,
    a locking bead formed integrally with, and extending upwardly along the laterally outward edge portion of one of said side flanges of each pair thereof, each locking bead being shaped and located to fit into the locking bead recess of its respective side wall upon a selected movement of the floor slab relative to such side wall,
    a first half of a plastic key interlock joint comprising a laterally outwardly open channel formed along, and comprising the laterally outward edge portion of the other of said side flanges of each pair thereof, an interlock projection extending along each side of each of said channels, both of the projections of each pair thereof extending in the same direction as the locking bead on said one flange of their respecting pair thereof,
    a second half of each plastic interlock joint comprising a pair of recess defining means integral with each side wall, and extending lengthwise along the joint surface thereof in parallel, spaced relation to their respective bead receiving recesses, and to each other, each of the latter recess defining means being shaped and located to define a recess shaped and positioned to receive one of said interlock projections in fitted relation therein upon such selected, relative movement of the floor slab and side wall, one of the latter recess defining means of each pair thereof being located within each of side channels, of a height to extend substantially to the bottom of its respective channel, and of a width for limited movement transversely therein, whereby such selected, relative movement of the floor slab and side wall opens up a key forming passage lengthwise within each joint for the reception of flowable, solidifiable, key forming compound for retaining said beads and said interlock projections in their respective recesses, thereby completing the joint structure.

2. A transit vehicle floor-to-side wall joint as claimed in claim 1, wherein each floor slab is a sandwich panel comprising a structural plastic foam core interposed between upper and lower surface sheets of suitable metal, the surface sheets extending laterally beyond the core on each side of the panel, and each pair of said flanges comprise the side flanges of a channel member fitted between, and secured to, the laterally extending portions of the floor panel surface sheets along each side of the panel.

3. A floor-to-side wall joint as claimed in claim 1, wherein each interlock projection comprises:
    a flange extending vertically along each side of its respective channel, and each of said recess defining means comprises an angle flange integral with each side wall extrusion and extending along each such sidewall joint surface.

4. Floor-to-side wall joint structure as claimed in claim 2, wherein the lower side wall extrusion is a strake of relatively thin cross sectional shape, and the angle flanges and the flanges extending from the sides of the channels are all of extruded material of approximately the same thickness.

* * * * *